E. W. JOY,

Assignor, by mesne assignments, to PATTEE PLOW COMPANY.

CULTIVATOR.

No. 10,297. Reissued Mar. 20, 1883.

Witnesses:
P. R. Richards.
Chas. E. Leland.

Inventor.
Edwin W. Joy.
By W. B. Richards,
Atty.

N. PETERS, Photo-Lithographer, Washington, D. C.

UNITED STATES PATENT OFFICE.

EDWIN W. JOY, OF IOWA CITY, IOWA, ASSIGNOR, BY MESNE ASSIGNMENTS, TO PATTEE PLOW COMPANY, OF MONMOUTH, ILLINOIS.

CULTIVATOR.

SPECIFICATION forming part of Reissued Letters Patent No. 10,297, dated March 20, 1883.

Original No. 182,449, dated September 19, 1876. Application for reissue filed January 5, 1883.

*To all whom it may concern:*

Be it known that I, EDWIN W. JOY, a citizen of the United States, and a resident of Iowa City, in the county of Johnson and State of Iowa, have invented certain new and useful Improvements in Tongueless-Cultivator Attachments; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to cultivators in which short independent axles are hinged to a yoke connecting the two axles to allow horizontal oscillation of wheels relatively to the beams, and which are used without a tongue; and it consists of the application of another yoke in a manner to regulate the oscillation of the wheels and prevent them from cramping too much and binding against the beams, as they do in common arrangement.

Figure 1:
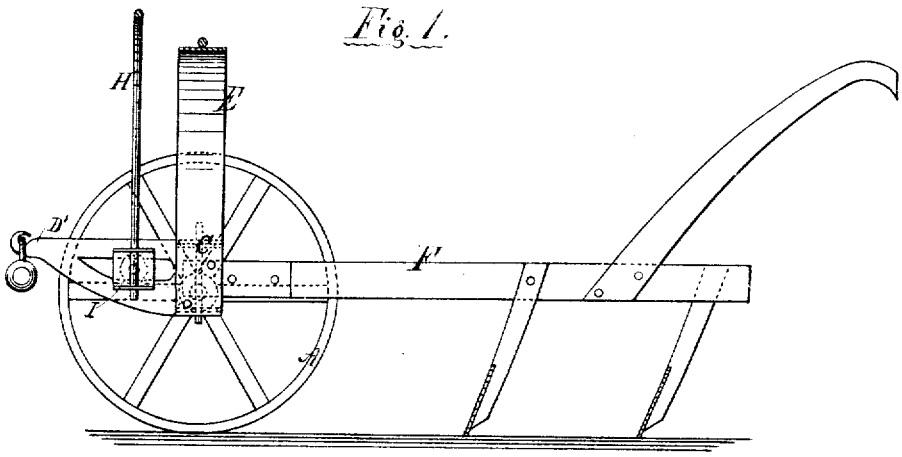
Figure 2:
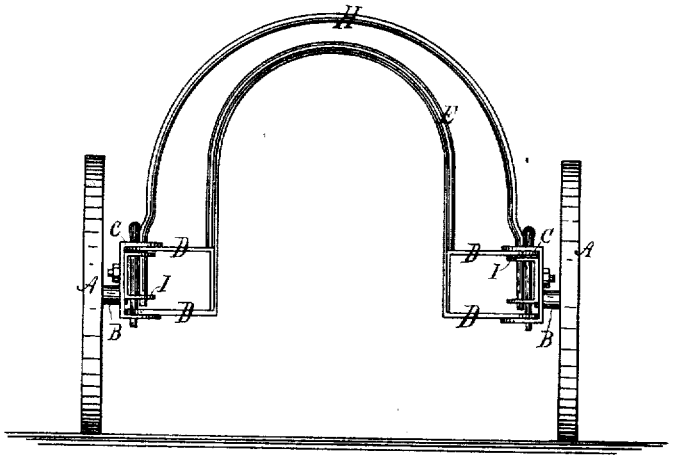

Figure 1 is a longitudinal sectional elevation of my improved machine, and Fig. 2 is a front elevation.

Similar letters of reference indicate corresponding parts.

A represents the wheels, which are mounted on the short independent axles B, that are hinged to the heads D of the yoke E at C to allow them to swing horizontally relatively to the beams F, which are attached to the heads B.

The whiffletrees are attached to the draft-bars D′, which extend forward from the axles suitably for that purpose, and the draft is thus applied without a tongue for regulating the lateral vibration of the wheels, thus leaving them so free that in some cases they swing around across the front of the beams to such extent as to cramp and obstruct the machine, and they also swing back against the beams and cramp, so as to interfere with working properly, which to prevent I propose to combine another yoke, H, with the yoke E and the draw-bars D′, as shown, so that, although the wheels are still free to vibrate, they are so coupled that they work in unison, so as to check each other and have the whole of the draft acting on them to prevent too much vibration, and thus make the machine work much better than as before constructed. In this example the yoke H is represented as mounted in the adjusting-pieces I, attached to the draft-bars D′; but it may be connected in any other approved way, and the connecting-pieces may be cast upon the bars D′, if preferred.

Having thus described my invention, I claim as new and desire to secure by Letters Patent—

The combination of yoke H with the draft-bars D′ and with the wheels A, working on independent axles B, hinged to yoke E, substantially as specified.

In testimony whereof I affix my signature in presence of two witnesses.

EDWIN W. JOY.

Witnesses:
CHAS. BAKER,
G. M. KENYON.

Corrections in Reissue Letters Patent No. 10,297.

It is hereby certified that in Reissue Letters Patent No. 10,297, granted March 20, 1883, upon the application of Edwin W. Joy, of Iowa City, Iowa, for an improvement in "Cultivators," the reference letter "B" in line 34 of the printed specification was erroneously substituted for the reference letter "D;" and that the reference letter "D" should be read in the said specification to make the same conform with the record of the case in the Patent Office.

Signed, countersigned, and sealed this 17th day of April, A. D. 1883.

[SEAL.]

M. L. JOSLYN,
*Acting Secretary of the Interior.*

Countersigned:

E. M. MARBLE,
*Commissioner of Patents.*